US005965039A

United States Patent [19]
Kitahashi et al.

[11] Patent Number: 5,965,039
[45] Date of Patent: Oct. 12, 1999

[54] PLASMA TORCH

[75] Inventors: Masamitsu Kitahashi; Hiroyuki Tokunaga, both of Kanagawa-ken, Japan

[73] Assignee: Komatsu Ltd., Japan

[21] Appl. No.: 08/875,679

[22] PCT Filed: Feb. 13, 1996

[86] PCT No.: PCT/JP96/00305

§ 371 Date: Aug. 4, 1997

§ 102(e) Date: Aug. 4, 1997

[87] PCT Pub. No.: WO96/25266

PCT Pub. Date: Aug. 22, 1996

[30] Foreign Application Priority Data

Feb. 13, 1995 [JP] Japan .................................... 7-024234

[51] Int. Cl.[6] ................................................... B23K 10/00

[52] U.S. Cl. ................................ 219/121.5; 219/121.49; 219/121.48; 219/75

[58] Field of Search ........................... 219/121.47, 121.5, 219/121.48, 121.51, 121.49, 74, 75; 313/231.31, 231.41

[56] References Cited

U.S. PATENT DOCUMENTS

| | | | |
|---|---|---|---|
| 4,087,670 | 5/1978 | Miller | 219/121.5 |
| 4,423,304 | 12/1983 | Bass et al. | 219/121.5 |
| 4,792,657 | 12/1988 | Conley | 219/121.39 |
| 4,924,060 | 5/1990 | Delzenne | 219/121.48 |
| 5,220,150 | 6/1993 | Pfender et al. | 219/121.51 |
| 5,328,516 | 7/1994 | Dietiker | 219/121.5 |
| 5,412,173 | 5/1995 | Muehlberger | 219/121.47 |
| 5,519,183 | 5/1996 | Mueller | 219/121.5 |

FOREIGN PATENT DOCUMENTS

| | | |
|---|---|---|
| 56-4351 | 1/1981 | Japan . |
| 62-47630 | 10/1987 | Japan . |
| 63-39347 | 8/1988 | Japan . |
| 63-196375 | 12/1988 | Japan . |
| 1-60783 | 4/1989 | Japan . |
| 2-108575 | 8/1990 | Japan . |
| 5-379 | 1/1993 | Japan . |

*Primary Examiner*—Mark Paschall
*Attorney, Agent, or Firm*—Rader, Fishman & Grauer; Ronald P. Kananen

[57] ABSTRACT

There is provided a plasma torch in which a plasma arc emanating from an electrode in a torch body (1) is pinched in a torch nozzle (3) and is then flushed therefrom, characterized in that an axis of said torch nozzle (3) is deviated in position from with a center line of said torch body (1).

9 Claims, 7 Drawing Sheets

PLASMA TORCH

TECHNICAL FIELD

The present invention relates to a plasma torch in which its good accessibility to a working zone is required as in a welding or cutting operation.

BACKGROUND ART

In a plasma cutting or welding process, especially where a workpiece or a pair of workpieces having a configuration in which the accessibility of a plasma torch thereto is poor, it has been necessary to employ a plasma torch having an elongated forward end.

If, however, such a plasma torch having an elongated forward end is employed, a problem has been encountered a large welding or cutting current a torch nozzle tends to be melted and damaged due to an insufficient cooling thereof. The required cooling effect does then become insufficient since it is unable to ensure a sufficient water coolant passage up to a point of the arc restraining region or the forward end of the said torch nozzle that tends to be elevated in temperature by an arc heat as well as by a radiation heat from the work due to the dimensional limitation of the said plasma torch.

In an attempt to meet with this problem, there has hitherto been proposed a modified plasma torch, as disclosed in Japanese Examined Patent Publication No. Sho 62-47630 or Japanese Examined Patent Publication No. Sho 63-39347, that is designed to make its forward end flat, thereby enhancing its accessibility to a workpiece in two side directions, and at the same time to provide a cooling water passage around a torch nozzle, thereby enhancing the ability to cool the torch nozzle.

Such a plasma torch in the prior art has its forward end flat in horizontal cross sectional, approximately rectangular, configuration and its torch nozzle whose axis is located as coincident with a center line of its torch body. And, the said plasma torch has a cooling water feed passage and a cooling water return passage distributed at both sides of the said torch nozzle, the two passages being configured to communicate with each other at the forward end of the said torch nozzle so that said both sides and said forward end of the torch nozzle may be cooled.

There has also been proposed in the prior art a plasma torch of another configuration, as disclosed in Japanese Unexamined Utility Model Publication No. Hei 1-60783, in which an electrode thereof is fitted and supported in an electrically conducting section of its torch body and a torch nozzle is disposed outside of this electrode via a spacer (constituted of a guide cylinder) of an insulating material. And, in it, the shortest gap section between the electrode and the torch nozzle is provided in the vicinity of an electrode forward end so that a dielectric breakdown due to a high frequency voltage which develops when a pilot arc is ignited may occur in the said shortest gap section (in the vicinity of the electrode forward end) while preventing an abnormal discharge which might otherwise be produced in any area other than the electrode forward end within the torch body.

Also, there has been a plasma torch of still another design in the prior art, as disclosed in Japanese Unexamined Patent Publication No. Hei 5-379, Japanese Examined Patent Publication No. Sho 56-4351, which is provided with a cap that is attached to an electrical insulator mounted to surround the forward end of its torch body whereby a welding or a cutting operation is carried out while maintaining a standoff constant by holding the said cap in contact with a workpiece.

It may be noted that a conventional plasma torch of "flat" type as mentioned above has the advantage that the closeness of the outer surfaces of both sides in two directions of the thinner portion of its horizontal cross sectional configuration from the axis of the torch nozzle leads to a good accessibility to a workpiece at these both sides, which in turn leads to the ability to weld while displacing towards the thicker portion of the said cross sectional configuration. The plasma torch can even be inserted even into a groove section if the root faces of a groove edge butt section of thick plates are to be welded together. With this construction, however, it should be noted that since the accessibility to the workpiece is only good at the both sides of the said thinner portion of the cross sectional configuration, applicable workpieces are limited; furthermore, if the plasma torch furthermore if mounted on a robot, and a rectilinear welding operation is to be performed there will be a number of singular points generated which are impractical in a posture of the robot. Hence, there arises a limited flexibility. Furthermore, there arise the problems that such a plasma torch in the prior art, with the torch nozzle as a consumable part being of a flat configuration, may make an entire machining process for a given purpose complicated, may require a brazing step, thus making the process highly expensive, and will necessarily make a running cost hereof prohibitively high.

Also, in a plasma torch in the prior art of the type mentioned above the shortest gap section between the electrode and the torch nozzle is located in the vicinity of the electrode forward end, and is designed to dispose an outer torch nozzle around the electrode forward end via a guide that is composed of an insulating material. Further, such a plasma torch is designed to dispose, in the vicinity of the electrode forward end, the shortest gap section between the electrode and the torch nozzle so that a dielectric breakdown with a high frequency voltage that develops when a pilot arc is ignited may occur in the said shortest gap section (in the vicinity of the electrode forward end), thereby preventing a discharge (abnormal discharge) that might otherwise occur in an area other than the electrode forward end. However, since there should naturally be a space (gap) produced between the said guide (of an insulating material) and the torch body, especially if the said guide is leaked with a water coolant or in the like situation, the problems arise that when the pilot arc is generated, a so-called creeping discharge will be generated over the guide surface. Thus, a discharge (abnormal discharge) will develop between an area other than the electrode forward end and the torch nozzle to the extent that the torch nozzle may be burnt or otherwise damaged.

Alternatively, another plasma torch in the prior art in which the torch body has a cap attached to its forward end, has said cap attached to the electrical insulator mounted around the forward end of the torch body and is designed to carry out a welding or a cutting operation while maintaining a standoff constant by holding the said cap in contact with a workpiece. This enables an arc length to be held constant and the cutting or welding quality to be stabilized. Also, if this is used in welding, it has been noted that especially in an arc spot welding process, since a welding spot can be covered with the cap attached to the forward end, there ensues an enhanced shielding effect so that such a welding spot may remain unoxidized. With any of these plasma torches, however, since the forward end cap is directly in contact with a workpiece, certain problems are not avoidable. Thus, due to a heat conduction from the workpiece or by receiving a radiation heat from the arc, the cap tends to be melted and deformed. This results in the inability to maintain the standoff constant and causes the torch itself to be melted and damaged. Also, in a plasma torch in which a plasma gas is swirled, the problem has been found to develop that depending on a particular shape of a gas venting hole provided, if a workpiece arc spot is shielded, an air may be entrapped into a chamber constituted by the torch body and the cap to oxidize arc spot or a flow of the gas in the chamber may be disturbed, thereby lowering welding quality.

The prevent invention has been made with the foregoing problems in consideration.

It is a first object of the present invention to provide a plasma torch whereby where an electrode and a torch nozzle, especially the forward end of the torch nozzle and an arc restraining section or its vicinity that receives a radiation heat from an arc or a working zone, are enough cooled by a water coolant, the lengths from the axis of the torch nozzle in at most three directions are minimized, the accessibility to a workpiece in the said directions is predominantly enhanced while providing less costly. The electrode and the torch nozzle which are regarded as consumable parts and are readily machinable since they are arranged to be symmetrical to each other.

Also, it is a second object of the present invention to provide a plasma torch whereby a creeping discharge path of a guide surface within a torch body is blocked, thereby preventing the occurrence of an abnormal discharge within the torch and preventing the torch from being burnt and otherwise damaged.

It is a third object of the present invention to provide a plasma torch which is capable of preventing a workpiece engaging or contacting cap attached to the forward end thereof from being melted and deformed by permitting it to be cooled by a water coolant in order to maintain a standoff constant, permits a workpiece arc illumination peripheral region to contact with the said cooled workpiece contacting cap and to be cooled thereby and, especially where a lap spot welding operation is to be performed, permits the diameter of a molten pool on the workpiece front side to be minimized so as to enhance the appearance quality of the welded workpiece, and further permits an arc illumination area to be shielded completely from the outer atmosphere while preventing a flow of the plasma gas from being disturbed so as to enhance the welding quality and stability.

SUMMARY OF THE INVENTION

In order to achieve the first object mentioned above, there is provided in accordance with the present invention, a plasma torch in which a plasma arc emanating from an electrode in a torch body is pinched in a torch nozzle and is then flushed therefrom, characterized in that an axis of the said torch nozzle is deviated in position from a center line of the said torch body.

And, a plurality of medium passages in the said torch body may be all or in part disposed in a given side to the center line of the said body torch.

Also, an annular water coolant chamber having a water coolant passed therethrough may be disposed in a portion surrounding an arc restraining region of the said torch nozzle or the vicinity thereof.

Further, the said electrode and the said torch nozzle may be symmetrical in cross sectional configuration to each other.

According to the construction mentioned above, it should be noted that as the axis of the said torch nozzle is deviated in position from the center line of the said torch body so shaped as to be flat, the sizes of the said torch nozzle in at most three directional sides therearound relative to the axis thereof can be minimized to enhance the torch accessibility to a working zone so that a welding or a cutting operation for a workpiece which is even of a complicated shape may be carried out at a maximum efficiency.

Also, in such an operation, since the electrode and the torch nozzle are cooled with the water coolant and especially the forward end of the torch nozzle and the arc restraining section or an area proximal thereto that receives a radiation heat from the working zone are enough cooled, it should be noted that the life of a consumable part such as the torch nozzle should remain long if a large electric current is passed for the operation.

And, since these consumable parts such as the torch nozzle can be arranged so as to be symmetrical to one another and the accessibility to the workpiece can be ensured by the torch body itself, the latter do not need to be of an elongated configuration, with the result in that a processing amount is reduced and hence the torch body can be inexpensively furnished. Accordingly, a plasma torch according to the present invention is superior in the running cost as well to a plasma torch in the prior art.

Also, in order to achieve the second object mentioned above, there is provided in accordance with the present invention a plasma torch in which a plasma arc emanating from an electrode in a torch body is pinched in a torch nozzle and is then flushed therefrom, characterized in that the said electrode and the said torch nozzle are disposed coaxially to each other via an insulating member and that a space other than in the vicinity of an electrode tip which is intermediate between the said insulating member and the said torch body is all or in part axially blocked by a second insulating member.

Also, the said second insulating member for shielding the space between said electrode and said torch nozzle may be composed of an elastic material.

According to the construction mentioned above, it should be noted that despite the development of a breakdown high voltage across the electrode and the torch nozzle when a pilot arc is generated, the construction in which the electrode and the torch nozzle are disposed coaxially with each other via the insulating material (constituted of a guide cylinder) and the space between the guide and the torch body is all or in part axially blocked by the second insulating material serves to cut off any creeping discharge path over the guide surface. This advantageously acts to eliminate any discharge in an area other than in the vicinity of the electrode tip interior of the torch, which would result in an abnormal discharge, thereby preventing the torch from being accidentally burnt or otherwise damaged.

Further, in order to achieve the third object mentioned above, there is provided in accordance with the present invention a plasma torch in which a plasma arc emanating from an electrode in a torch body is pinched in a torch nozzle and is then flushed therefrom, characterized in that the said torch body has a workpiece contacting cap detachably attached thereto, the said cap having a coolant water passage disposed therein in which a water coolant is passed.

According to the above mentioned construction, it should be noted that since the workpiece contacting cap fitted on the forward end of the plasma torch in order to maintain a standoff constant is cooled by the water coolant, the said workpiece contacting cap is effectively prevented from being melted and deformed. In addition, since a workpiece arc illumination peripheral region is contacted with the said cooled workpiece contacting cap and is cooled thereby, especially where a lap spot welding process is to be performed, the diameter of a molten pool on the workpiece front side can be minimized, thereby enhancing the appearance quality of the welded workpiece.

The present invention also provides a plasma torch in which a plasma arc emanating from an electrode in a torch body is pinched in a torch nozzle and is then flushed therefrom, characterized in that the said torch body has attached thereto a workpiece contacting cap, the said cap being provided with a gas venting recess (e.g., a hole or groove) for permitting an exhaust gas to be swirled out therethrough.

According to the construction mentioned above, it should be noted that especially in a plasma torch of plasma gas swirling flow type, not only can an arc illumination region be completely shielded from the outside atmosphere, but also a plasma gas is allowed to flow smoothly in a chamber constituted of the torch body, the workpiece contacting cap and a workpiece, thus serving to enhance the welding quality and safety.

BRIEF EXPLANATION OF THE DRAWINGS

The present invention will better be understood from the following detailed description and the drawings attached hereto showing certain illustrative embodiments of the present invention. In this connection, it should be noted that such embodiments as illustrated in the accompanying drawings are intended in no way to limit the present invention but to facilitate an explanation and understanding thereof.

In the accompanying drawings.

BEST MODES FOR CARRYING OUT THE INVENTION

Hereinafter, suitable embodiments of the present invention with respect to a plasma torch will be set forth with reference to the accompanying drawings hereof.

Figure 1:
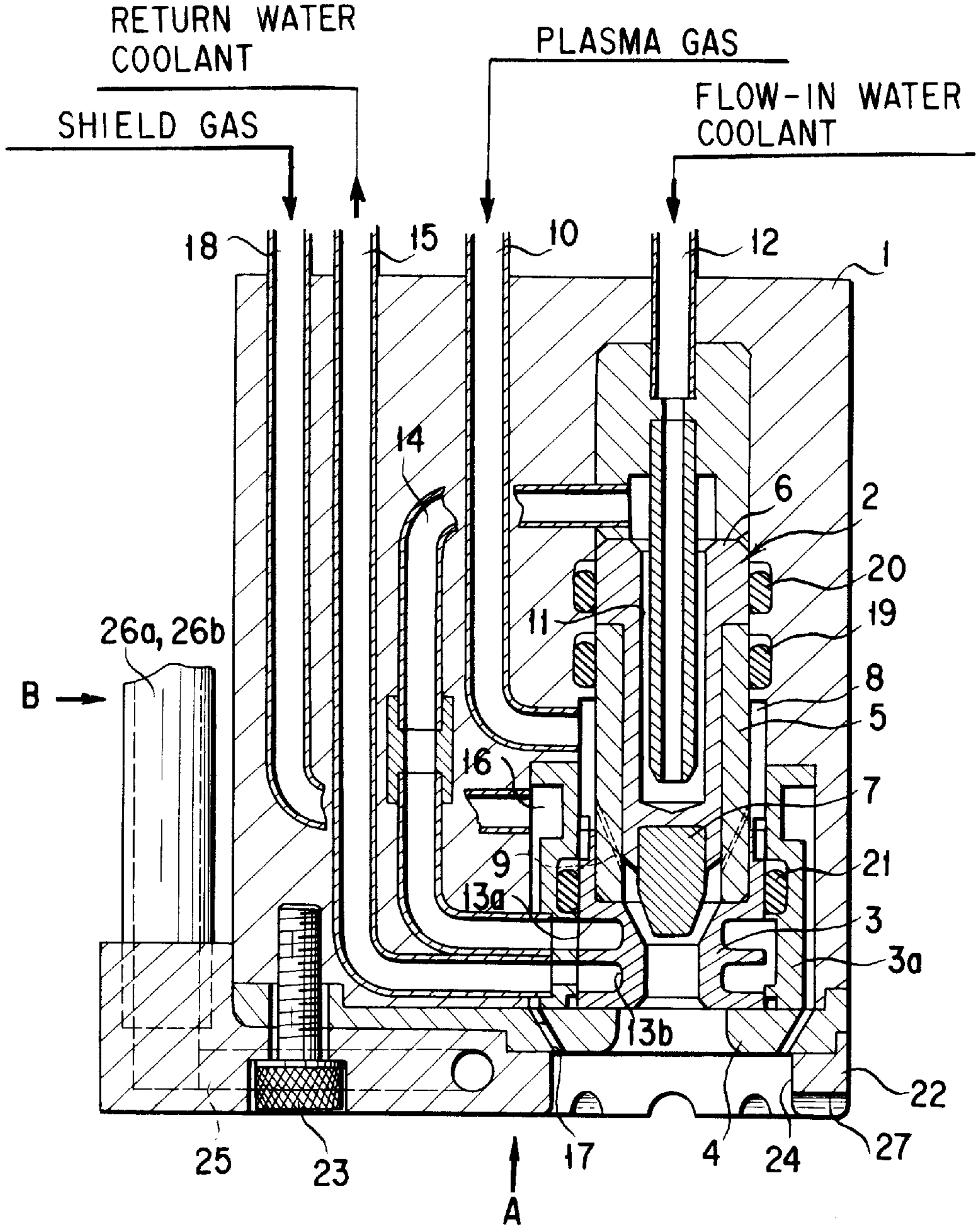
FIG. 1 is a cross sectional view that shows a first embodiment of a plasma torch according to the present invention.

FIG. 1 shows a first embodiment of a plasma torch according to the present invention. In the Figure, numeral 1 designates a torch body which in this embodiment is shown for a forward end thereof only. The said torch body 1, for the purpose of establishing an electrical insulation with any external part, is composed of a synthetic resin. The said torch body 1 is provided at its forward end side with an electrode 2 which has towards its forward end side an electrically conductive torch nozzle 3 and a torch head cover 4 which are arranged coaxially with each other relative to a nozzle axis. The above mentioned electrode 2 comprises an electrode support 6 that is supported by the said torch body 1 via a guide cylinder 5 composed of an insulating material, e.g., a ceramic or a resin, and an electrode piece 7 that is attached to the forward end of the said electrode support 6 by brazing or as pressure inserted. Also, the above mentioned torch nozzle 3 is held in an electrical insulation and contacting relationship with the said electrode 2 via the said guide cylinder 5. Also, the said torch cover 4 is composed of an electrically insulating and heat resistant material such as a ceramic or the like.

Also, outside of the said guide cylinder 5 supporting the said electrode 2 there is provided a plasma gas chamber 8, which communicates with a front side space of the said electrode piece 7 via a gas nozzle 9 that is provided in the said guide cylinder 5 and constitutes a swirler such that a plasma gas may blow out while being swirled. And, the said plasma gas chamber 8 has a plasma gas supply passage 10 connected thereto.

Also, inside of the electrode support 6 of the said electrode 2 there is provided an electrode cooling chamber 11 sealed by a sealing member 20 fitted on the outer surface of the said electrode support 6, into which is inserted a water coolant flow-in passage 12.

Also, around an arc restraining section of the said torch nozzle 3 there are provided a pair of annular cooling chambers 13*a* and 13*b* which are axially deviated in position and which in a location communicate with each other. One annular cooling chamber 13*a* has connected thereto the outlet side of the said electrode cooling chamber 11 of the above mentioned electrode support 6 via a torch nozzle water coolant flow-in passage 14.

Figure 4:
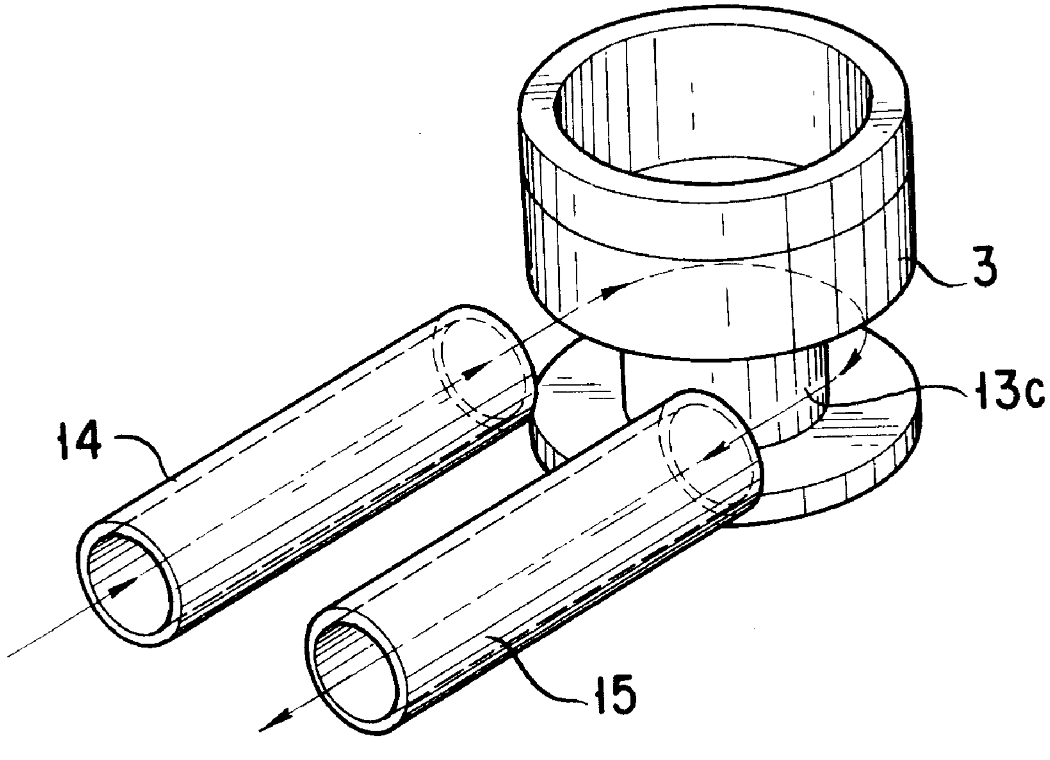
FIG. 4 is a perspective view that shows another example of the torch nozzle water coolant chamber shown in the above mentioned first embodiment.

Also, the other annular cooling chamber 13*b* has a water coolant return passage 15 connected thereto. It should be noted at this point that the torch nozzle water coolant passage may be one as shown in FIG. 4 in which a single water coolant chamber 13 has connected thereto a water coolant flow-in passage 14 and a water coolant return passage 15 which are horizontally deviated in position with each other. With such a construction, a like torch nozzle cooling effect is obtainable.

Further, around the forward end portion of the said electrode 2 and the said torch nozzle 3 there is provided a shield gas chamber 16, which is connected to a shield gas nozzle 17 formed in the said torch head cover 4. And, the above mentioned shield gas chamber 16 has a shield gas supply passage 18 connected thereto.

Figure 2:
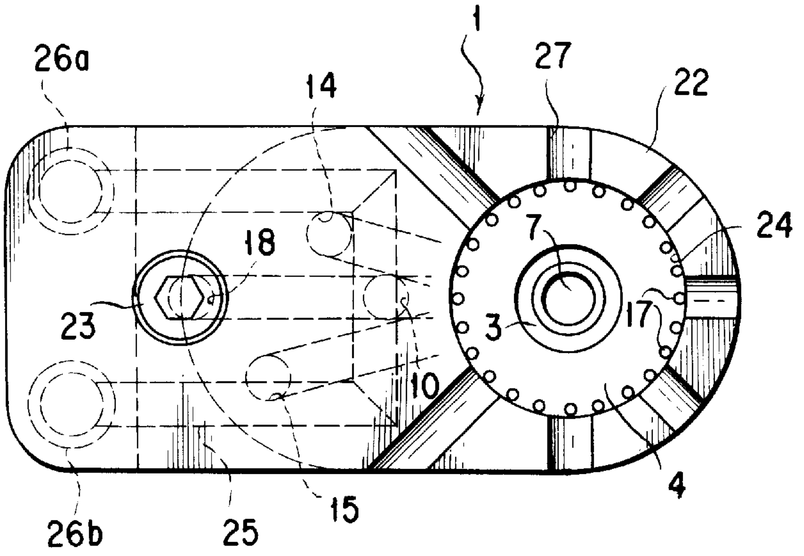
FIG. 2 is a view taken in a direction that is shown by the arrow A in FIG. 1.

The above mentioned torch body 1 is flat and approximately elliptic in cross sectional configuration as shown in FIG. 2. The above mentioned torch nozzle axis is deviated in position towards one side in the longitudinal direction of this cross sectional configuration of the torch body 1. The respective passages are connected transversely to the said water coolant chambers and the said gas chamber which are located in the torch nozzle axial area, i.e., the said torch nozzle water coolant flow-in passage 14, the said water coolant return passage 15, the said plasma gas supply passage 10 and the said shield gas passage 18 are disposed at the other side of the said torch nozzle axis. And, the end portion of the torch nozzle axis side of the said torch body 1 is semi-spherical about a center constituted by the said torch nozzle axis. The portion that is semi-spherical may have a thickness that is sufficient to retain the said electrode 2, the said torch nozzle 3, the said torch head cover 4 and so forth with its radius being a minimum as required.

This enables the sizes of maximum three directional sides about the axis of the said torch nozzle 3 in the above mentioned first embodiment of a plasma torch according to the present invention to be largely reduced as compared with those in a plasma torch in the prior art, thus markedly enhancing the accessibility to a workpiece and permitting even a workpiece complicated in shape to be welded and cut with an increased efficiency. In such a welding or a cutting operation, the said electrode 7 and the said torch nozzle 3 are allowed to be cooled forcibly by a water coolant, permitting the forward end portion of the said torch nozzle 3 and the arc restraining portion or an area in the vicinity thereof in particular which are receiving a radiation heat from an arc or a working zone to be fully cooled. It should be noted that if the cooling medium is an alcohol, an oil or a mixture thereof other than water, a like cooling effect can be obtained as well as with water.

Thus, with the construction mentioned above, since the said electrode 2 and the said torch nozzle 3 can be sufficiently cooled if a large current operation is performed, a prolonged life of each consumable part is ensured. Also, since with the said torch body 1 itself as a consumable part being small sized, there is no need to make a consumable part thin and elongated and the processing amount when a consumable part is manufactured can be reduced, it is possible inexpensively consumable part inexpensively and, coupled with its prolonged life, to largely reduce a running cost of the system as compared with a plasma torch in the prior art.

Also, over the outer surface of the said guide cylinder 5 fitted with the said electrode support 6 there is fitted an insulating member 19 in the form of an O-ring for axially shielding or blocking the space (gap) between the said guide cylinder 5 and the said torch body 1.

The above mentioned insulating member as in the form of an O-ring in the present first embodiment is preferably composed of an elastic material which should also preferably have no water absorption properties.

Figure 3:
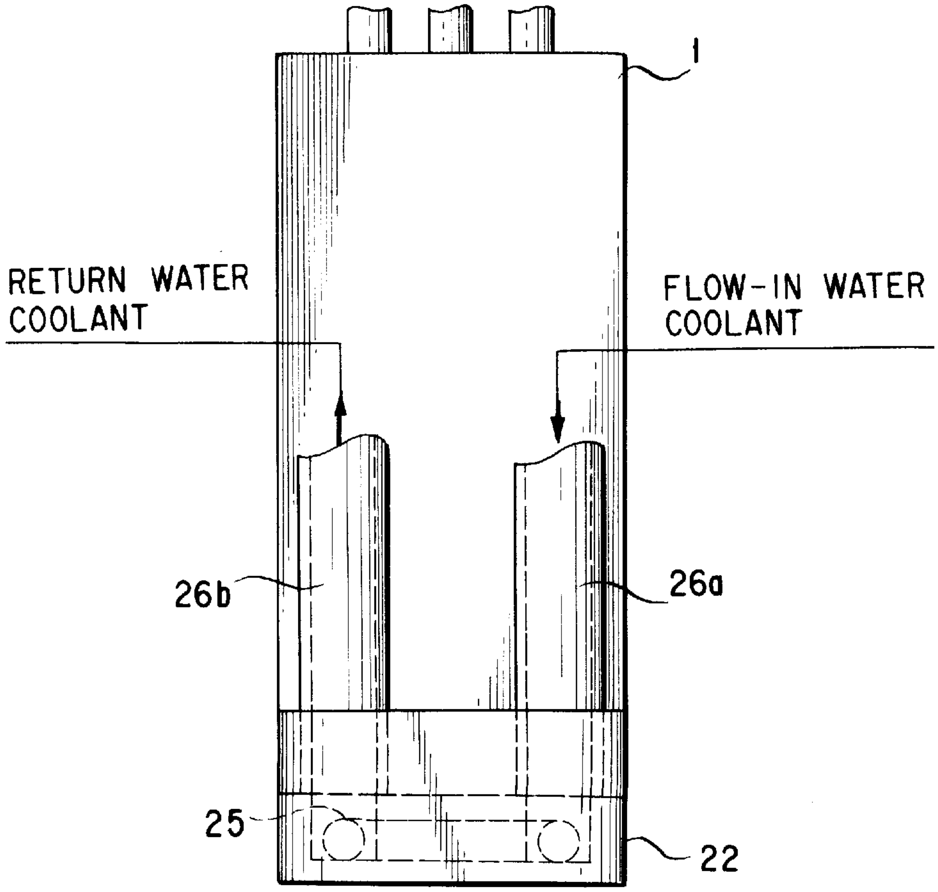
FIG. 3 is a view taken in a direction that is shown by the arrow B in FIG. 1.

To the forward end of the said torch body 1 there is detachably fitted a workpiece contacting cap 22 by means of a bolt 23. This allows a standoff in a welding or a cutting operation to be preliminarily established. The said workpiece contacting cap 22 in horizontal cross sectional configuration is substantially the same as the said torch body 1. About a position at which the said torch nozzle axis is located there is provided a plasma discharge outlet 24. And, at the opposite side deviated in position from the said plasma discharge outlet 24 there is provided a water coolant passage 25. As shown in FIGS. 1 through 3, the said water coolant passage 25 has a pair of forward and return water conduits 26*a* and 26*b* connected thereto. A gas venting groove 27 is provided at an end surface of the said workpiece contacting cap 22 and may be in the form of a hole. Also, such a gas venting groove or hole (generally termed recess) may be so constructed that an exhaust gas can be swirled out therethrough.

An explanation will now be given of an operation of the present first embodiment of the invention.

First, for an arc to be generated, it may be noted that an electrical insulation between the said electrode 2 and the said torch nozzle 3 will be broken with a high frequency voltage (high voltage) actuated to establish a discharge path between them. Thereupon, a pilot arc will be produced. Upon the said pilot arc shifting to a workpiece side, a plasma arc will be generated between the said electrode piece 7 and the workpiece(s) to cut the workpiece or to weld the workpieces together. Then, a plasma gas will be delivered in a swirled form, i.e. in a swirling gas flow state, from the said plasma gas supply passage 10 while a shield gas is being delivered from the said shield gas supply passage 18.

Owing to the fact that a high voltage exists between the said electrode 2 and the said torch nozzle 3 for the said dielectric breakdown to occur and for the said arc to be generated as mentioned above, it should be noted that especially when the-said guide cylinder 5 is wetted with the water coolant or the like or in a like situation, such a dielectric breakdown may not occur between the said electrode 2 and the said torch nozzle 3 in the vicinity of the electrode forward end. Instead, an insulation between a rearward portion of the said electrode 2 and a rearward portion of the said torch nozzle 3 may be broken (through a creeping discharge), establishing a discharge path on the said guide cylinder 5 and permitting a pilot arc to be initiated along the said discharge path. This may cause the torch to be burnt or otherwise damaged. Such a phenomenon tends to take place frequently if the plasma gas is constituted by a gas such as argon that is liable to cause a dielectric breakdown. In the present first embodiment of the invention, however, it should be noted that since among paths of an abnormal discharge that may be produced between the said electrode 2 and the said torch nozzle 3 in an area other than a forward end portion of the said electrode 2, any possible creeping discharge path on the surface of the said guide cylinder 5 is blocked by the said insulating member 19, and any abnormal discharge within the said torch body 1 and the resulting torch burning or damage can effectively be prevented.

Then, it should also be noted that the said workpiece contacting cap 22 is cooled as well with the water coolant when it is used. With the said workpiece contacting cap 22 being cooled, it can be seen that a portion at which it is in contact with a workpiece will be cooled with the periphery of the said plasma discharge outlet 24. This will cause, especially where a lap spot welding operation is to be carried out, the diameter of a molten pool on the workpiece front side to be minimized and the workpiece to be prevented from being thermally deformed, thereby enhancing the appearance quality of the welded workpiece.

Figure 5:
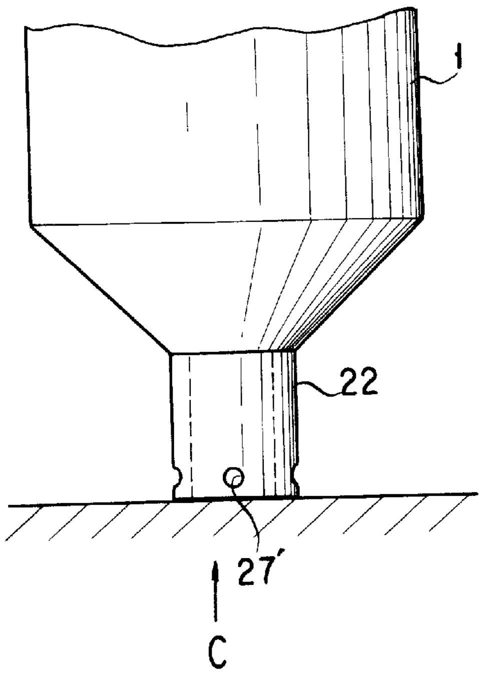
FIG. 5 is a front view that shows another example of the workpiece contacting cap that is shown in the above mentioned first embodiment.
Figure 6:
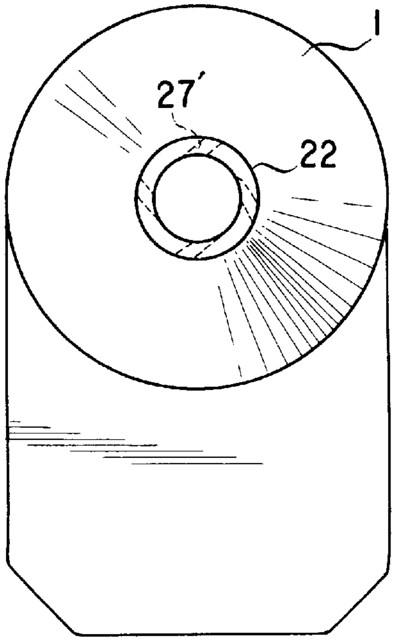
FIG. 6 is a view taken in a direction that is shown by the arrow C in FIG. 5.

Furthermore, as shown with another example in FIGS. 5 and 6, it should be noted that if the construction is adopted in which an exhaust gas is discharged while it is being swirled out through a gas venting hole 27' provided at an end surface of the said workpiece contacting cap 22 (in a direction in which the plasma gas is being swirled out), the arc illumination region can be completely shielded from the outside atmosphere and the gas will be allowed to flow smoothly in a chamber constituted of the said torch body 1, the said workpiece contacting cap 22 and the workpiece, thereby markedly enhancing the welding quality as well as the safety.

Figure 7A:
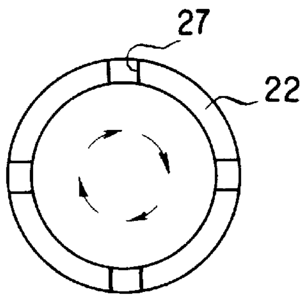
FIGS. 7A and 7B are explanatory views which show a gas venting groove that is formed in the workpiece contacting cap in the prior art.
Figure 7B:
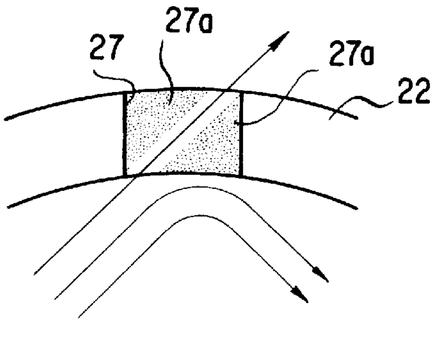

This principle will be set forth below with reference to FIGS. 7A and 7B. FIG. 7A shows the configuration of a gas venting groove for the exhaust gas in a workpiece contacting cap in the prior art, in which especially if the plasma gas is being swirled, there will develop at a portion of the gas venting groove a stagnation space 27*a*, as shown in FIG. 7B, through which an outside air will enter and be entrapped in the chamber constituted of the torch body 1, the workpiece contacting cap 22 and a workpiece to oxidize the arc illumination region. Or, a swirling flow of the plasma gas will be irregularly reflected at a portion of the gas venting hole, thus disturbing a flow of the gas in the said chamber. These will cause the welding or cutting quality to remain unstabilized.

Figure 8A:
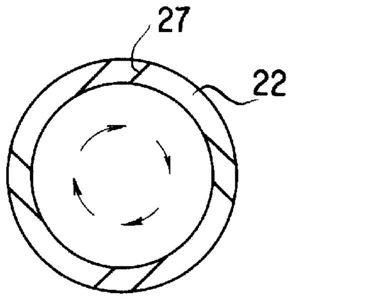
FIGS. 8A and 8B are explanatory views which shows a gas venting groove that is formed in the workpiece contacting cap in the above mentioned first embodiment.
Figure 8B:
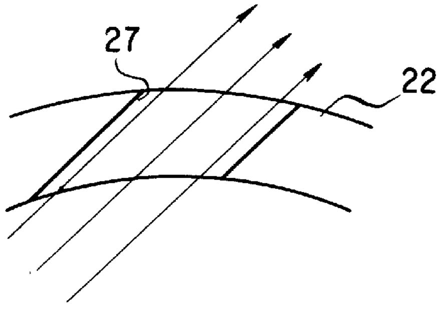

In contrast to the above, the said workpiece contacting cap 22 in the present first embodiment of the invention, as shown in FIG. 8A, has the said gas venting groove 27 arranged in a configuration opposing to the plasma gas flowing and will allow, as shown in FIG. 8B, the gas to be smoothly vented. Thus, since with no stagnation space generated as noted above, it prevents the outer atmosphere from entering into the said chamber and is therefore capable of completely shielding the arc illumination region and further does not disturb a swirling flow of the plasma gas in any manner whatsoever, it will follow that the cutting or welding quality is stabilized.

Figure 9:
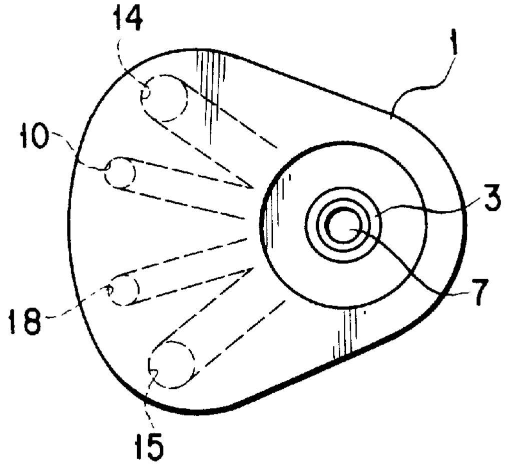
FIG. 9 is an explanatory view that shows another example of the state of arranging pipes within the torch in the above mentioned embodiment.

It should be noted that the present first embodiment is an example only of this invention and not intended to constrain the claims hereof. For example, as shown in FIG. 9, it suffices to say that a plasma torch in which as in the present first embodiment, pipes in the torch are concentrated in a portion thereof (not symmetrically) and the pipes are in part arranged in another portion thereof (not in three directions) to enhance the accessibility to a workpiece in a particular direction is naturally within the scope of the claims hereof.

Figure 10:
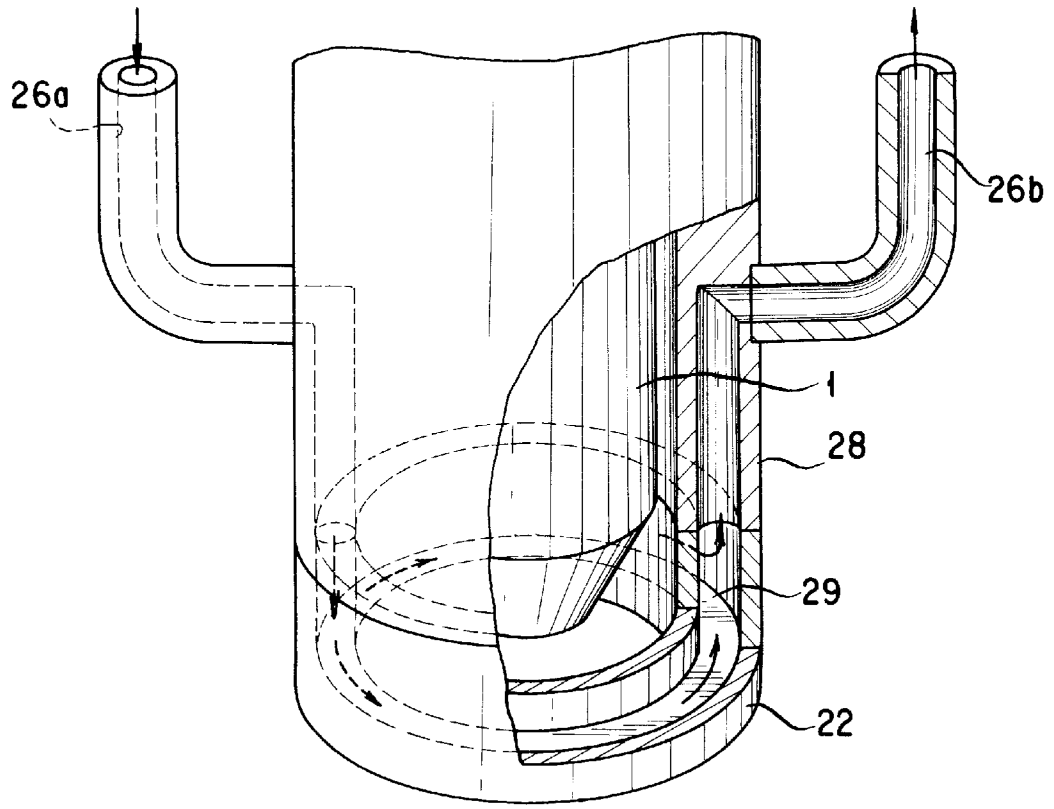
FIG. 10 is a perspective view broken in part that shows a workpiece contacting cap in a second embodiment of the present invention.

FIG. 10 shows a workpiece contacting cap in a second embodiment of the present invention.

In this second embodiment, a said workpiece contacting cap 22 that is detachably attached to the forward end of a workpiece contacting cap mounting cap 28 mounted to a said torch body 1 so as to surround it, is formed with a water coolant passage 29 coaxially with a said plasma flushing bore or outlet, and the said water coolant passage 29 has both a said flow-in water coolant passage 26*a* and a said return water coolant passage 26*b* connected thereto.

According to the present second embodiment of the invention, not only can the said workpiece contacting cap 22 be prevented from being melted or deformed with a further certainty, but the temperature distribution about the plasma flushing bore of the said workpiece contacting cap 22 will be made uniform. Thus, since it when used in a lap spot welding process serves to minimize the diameter of a molten pool, it can be seen that the appearance quality of a welded pair of workpieces will be further enhanced.

Figure 12:
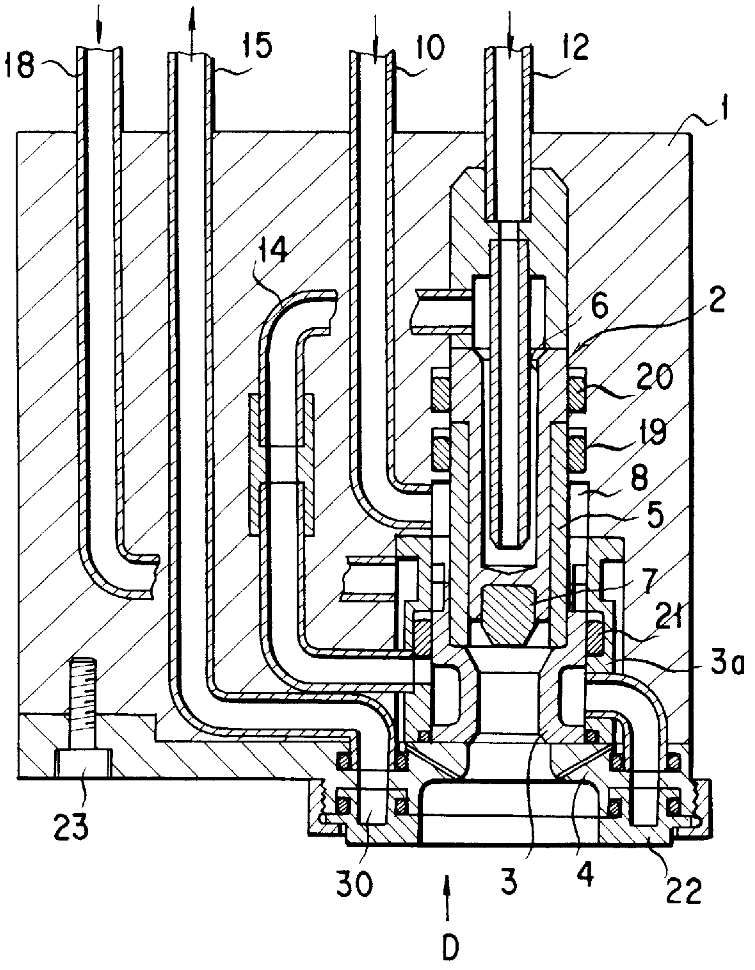
FIG. 12 is a view taken in a direction that is shown by the arrow D in FIG. 11.
Figure 11:
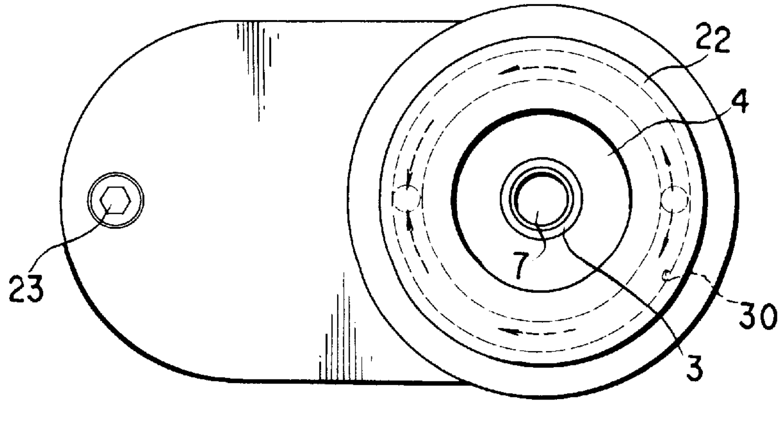
FIG. 11 is a longitudinal cross sectional view a third embodiment of the torch body according to the present invention.

FIGS. 11 and 12 show a torch body in a third embodiment of the present invention.

In this embodiment, a said workpiece contacting cap 22 that is detachably attached to the forward end of a said head cover 4 which is turn attached to the forward end of a said torch body, is formed with an annular water coolant passage 30 coaxially with a said plasma flushing bore, and the said coolant passage 30 has a said flow-in water coolant passage 14 and a said return water coolant passage 15 connected thereto.

It will be seen that the same effects can be obtained in the present third embodiment as with the preceding second embodiment of the invention.

As will be apparent from the foregoing description, the present invention provides the effects which are set forth below.

(1) A plasma torch according to the present invention in which the axis of a said torch nozzle 3 is deviated in position longitudinally of the horizontal cross section of a said torch body 1 formed so as to be flat, allows the sizes of the three directional sides around the axis of the said torch nozzle to be minimized, thus permitting its accessibility to a workpiece to be markedly enhanced and even a workpiece(s) complicated in shape to be cut or welded with a maximum efficiency.

In such an operation, since a said electrode 2 and a said torch nozzle 3 are allowed to cool with a water coolant and a forward end portion of the said torch nozzle 3 and the said arc restraining region or a vicinity thereof in particular which are receiving a radiation heat from an arc or a working zone are allowed to thoroughly cool, if a large current operation is carried out, the life of the said torch nozzle 3 as a consumable part can be prolonged. Also, since the said torch body 1 itself is small sized, there is no need to make the said torch nozzle 3 thin and elongated. As a result, the ability to reduce the processing amount when each consumable part is manufactured reduces the cost thereof. Thus, the running cost here is largely reduced as compared with a plasma torch in the prior art.

(2) A plasma torch according to the present invention in which a high voltage for a dielectric breakdown is applied across a said electrode 2 and a said torch nozzle 3 allows the said electrode 2 and the said torch nozzle 3 to be arranged coaxially with each other via an insulating member (a said guide cylinder 5) and is so configured that the space which exists between the said guide cylinder 5 and the said torch body 1 may all or in part be blocked by a said insulating member. Accordingly, any creeping discharge path over the surface of the said guide cylinder 5 whatsoever can be blocked, thus permitting any abnormal discharge whatsoever to be prevented from being produced inside of the said torch body 1.

(3) A plasma torch according to the present invention in which a said workpiece contacting cap 22 fitted on the forward end thereof in order to maintain a standoff constant is allowed to cool with a water coolant. Not only does this allow the said workpiece contacting cap 22 to be prevented from being melted or deformed, but the peripheral zone of an arc illumination portion on a workpiece is cooled by permitting the said cooled workpiece contacting cap to be held in contact with the workpiece. Especially if a lap spot welding operation is to be carried out, this enables the diameter of a molten pool on the workpiece front side to be minimized and prevents the workpieces from being thermally deformed, thus permitting the appearance quality of the welded workpieces to be markedly enhanced.

Furthermore, the ability to completely shield the arc illumination zone from the outer atmosphere and the ability to allow a gas to smoothly flow within a said chamber constituted of a said torch body 1, a workpiece contacting cap 22 and a workpiece enable the cutting or welding quality to be markedly enhanced.

While the present invention has hereinbefore been set forth with respect to certain illustrative embodiments thereof, it will readily be appreciated by a person skilled in the art to be obvious that many alterations thereof, omissions therefrom and additions thereto can be made without departing from the essence and the scope of the present invention. Accordingly, it should be understood that the present invention is not limited to the specific embodiments thereof set out above, but includes all possible embodiments thereof that can be made within the scope with respect to the features specifically set forth in the appended claims and encompasses all the equivalents thereof.

What is claimed is:

1. A plasma torch whereby a plasma arc emanating from an electrode in a torch body is pinched through a torch nozzle in the torch body and is then flushed into a working zone, characterized in that said torch body is of a flattened cross section transverse to an axial center line thereof and said torch nozzle is eccentric with said torch body and has a nozzle axis that is deviated in position from the axial center line of said torch body substantially in parallel therewith in a direction in which said flattened transverse cross section is elongate.

2. A plasma torch as set forth in claim 1, characterized in that a plurality of medium passages in said torch body are at least in part confined in a given side of the axial center line of said body torch opposite to a side in which said nozzle axis is located.

3. A plasma torch as set forth in claim 1, characterized in that an annular water coolant chamber having a water coolant passed therethrough is disposed in a portion surrounding an arc restraining region of said torch nozzle or the vicinity thereof.

4. A plasma torch as set forth in claim 2, characterized in that an annular water coolant chamber having a water coolant passed therethrough is disposed in a portion surrounding an arc restraining region of said torch nozzle or the vicinity thereof.

5. A plasma torch as set forth in any one of claims 1 to 4, characterized in that said electrode and said torch nozzle are symmetrical in cross sectional configuration to each other.

6. A plasma torch as set forth in claim 5, wherein said torch body has a workpiece contacting cap detachably attached thereto, said cap having a water coolant passage disposed therein in which a water coolant is passed.

7. A plasma torch as set forth in any one of claims 1 to 4, characterized in that said electrode and said torch nozzle are disposed coaxially to each other via an insulating member and that a space other than in the vicinity of an electrode tip which is intermediate between said insulating member and said torch body is all or in art axially blocked by a second insulating member.

8. A plasma torch as set forth in claim 7, characterized in that said second insulating member is composed of an elastic material.

9. A plasma torch whereby a plasma arc emanating from an electrode in a torch body is pinched in a torch nozzle and is then flushed therefrom against a workpiece, characterized in that said torch body has attached thereto a workpiece contacting cap, said cap being provided with a gas venting recess for permitting an exhaust gas to be swirled out therethrough in a direction which is the same as a direction that a plasma gas swirls.

* * * * *